(12) United States Patent
Matsumoto et al.

(10) Patent No.: US 8,036,416 B2
(45) Date of Patent: Oct. 11, 2011

(54) METHOD AND APPARATUS FOR AUGMENTING A MIRROR WITH INFORMATION RELATED TO THE MIRRORED CONTENTS AND MOTION

(75) Inventors: Takashi Matsumoto, Tokyo (JP); Wei Zhang, Palo Alto, CA (US); James M. A. Begole, San Jose, CA (US); Juan J. Liu, Milpitas, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1008 days.

(21) Appl. No.: 11/935,876

(22) Filed: Nov. 6, 2007

(65) Prior Publication Data
US 2009/0116766 A1    May 7, 2009

(51) Int. Cl.
*G06K 9/00* (2006.01)
(52) U.S. Cl. ........................................................ 382/100
(58) Field of Classification Search .................. 382/100, 382/111, 115, 305, 228; 348/211.99, E5.029, 348/333.01; 345/630, 419
See application file for complete search history.

(56) References Cited

U.S. PATENT DOCUMENTS
6,310,627 B1 * 10/2001 Sakaguchi .................... 345/630
6,459,824 B1 * 10/2002 Lee et al. ...................... 382/305
2008/0151092 A1 * 6/2008 Vilcovsky ................ 348/333.01
* cited by examiner

*Primary Examiner* — Samir Ahmed
*Assistant Examiner* — Atiba Fitzpatrick
(74) *Attorney, Agent, or Firm* — Shun Yao; Park, Vaughan, Fleming & Dowler LLP (57) ABSTRACT

One embodiment of the present invention provides a system that enables a user to visually compare the effects of one or more clothing sets in front of a mirror. During operation, the system detects and stores images of a user wearing a piece of clothing in front of mirror. Similar stored poses from either the user or from members of the user's social network can be retrieved later to compare the effects of the current piece of clothing to the retrieved clothing. The poses are then displayed in close proximity to the mirror so that the user can visually compare the effects. Displaying multiple such poses in sequence and in fast response to changes in the user's orientation creates the effect that the system is tracking the user's movements and presenting poses that are substantially synchronized to the user's movements.

23 Claims, 11 Drawing Sheets

METHOD AND APPARATUS FOR AUGMENTING A MIRROR WITH INFORMATION RELATED TO THE MIRRORED CONTENTS AND MOTION

BACKGROUND

1. Field

The present disclosure relates to retail fitting room systems. More specifically, the present disclosure relates to a method and an apparatus that enable a user to visually and simultaneously compare the effects of multiple pieces of clothing in front of a mirror.

2. Related Art

Shopping for clothes is a common activity which can be carried out either online or in physical stores. A common practice in a physical store is to search the inventory for items of interest, select a few for comparison and try them on to decide which, if any, to purchase. The shopper examines the clothes according to how well they fit physically, and also how well they fit the image of herself that she wants others to perceive. That is, the shopper not only checks whether a garment fits her body, but also whether it fits her style.

A shopper typically would like to compare multiple pieces of clothing in a fitting room. Modern visual technologies can augment this experience. A Prada boutique in Manhattan, N.Y., contains a dressing room with a variety of capabilities. A scanner identifies each garment as the shopper takes it in, providing additional information about the garment's price and alternate colors and sizes—the kind of information shoppers can find when browsing products online. The fitting room also contains a video camera that records the shopper's movements and plays back the video to the shopper.

The Magic Mirror by IconNicholson provides the ability for a user trying on clothes to send video of herself to friends who can send back comments and vote (thumbs up/down). The Magic Mirror can also project a static image of an alternate garment onto the mirror allowing the user to see how it might look on her.

SUMMARY

One embodiment of the present invention provides a system that augments a mirror with information related to the mirrored contents and motion. During operation, the system detects a first set of images of a user wearing a first piece of clothing in front of the mirror. The system then stores the first set of images. The system further detects a second set of images of the user wearing a second piece of clothing in front of the mirror. Subsequently, the system determines a current pose of the user based on the second set of images. The system then retrieves from the first set of images at least one image, wherein the retrieved image corresponds to the current pose of the user. The system displays the retrieved images in close proximity to the mirror in substantial synchronization with the user's motion, thereby enabling the user to visually compare effects of the first piece of clothing with the second piece of clothing.

In a variation of this embodiment, determining the current pose of the user based on the second set of images involves finding an orientation based on the second set of images and optionally processing the second set of images.

In a further variation, finding the orientation based on the second set of images involves extracting a top-view image, finding a body contour in the top-view image, and eliminating shapes of the user's arms from the top-view body contour when the arms are extended to the side or in front of the body. Furthermore, the system finds a best-fitting ellipse to the top-view body contour and determines a front side of the best-fitting ellipse.

In a further variation, finding a the body contour in the top-view image involves modeling a background; adapting to shifting lighting; finding a raw foreground by background subtraction; and removing false detections and filling in holes in the raw foreground by a morphological analysis.

In a further variation, removing false detections and filling in holes by a morphological analysis involves performing at least one of an opening analysis, closing analysis, and connected component analysis.

In a further variation, eliminating shapes of the user's arms from the top-view body contour involves determining body contour convexity and eliminating convex portions of the body contour by eroding and dilating the image using a kernel that is approximately the diameter of an arm.

In a further variation, determining the front of the best-fitting ellipse involves detecting a user's face.

In a further variation, determining the front-side of the best-fitting ellipse involves retrieving previous orientations of the user; finding a minor axis of the best-fitting ellipse; finding a most likely orientation of the minor axis with a probabilistic model applied to the previous orientations and a set of possible orientations of the minor axis; and optionally using the user's frontal features to distinguish the front-side from the back-side.

In a further variation, optionally processing the second set of images involves subtracting a background from the set of images, sub-sampling the pixels in the set of images, thresholding the pixels in the set of images, and mapping the images so that the images are translation-invariant.

In one variation of the present invention, retrieving at least one image that corresponds to the current pose of the user involves finding an orientation of the current pose, optionally processing the current pose, and retrieving an image wherein the difference between the retrieved image and the image corresponding to the user's current pose is minimized.

In one embodiment of the present invention, the system allows the user to control the orientation of the displayed images so that the displayed images do not necessarily match the user's current pose. In addition, other image processing techniques can be applied to the detected images.

DETAILED DESCRIPTION

The following description is presented to enable any user skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer readable media now known or later developed.

Overview

The ability to change information in reaction to the presence and motion of users has been demonstrated in several prior systems. Some commercial advertising technologies such as Reactrix, Freeset Human Locator and P.O.P. ShelfAds detect the presence and motion of users and change the content of the display in reaction. But these reactive displays do not display images that mirror the image or motion of the user looking at the display.

Some online services, such as Intellifit and MyShape take measurements of a customer's body and suggest clothes that will fit and provide a flattering appearance for that body shape. Other web services such as MyVirtualModel and 3Dshopping provide a 3D view of a shopper's measured body that can be used to simulate fitting clothes to the body that can be viewed from multiple angles.

In essence, these virtual fitting technologies are comparable to seeing clothing on a mannequin. However, in many cases, a customer would like to try the garment on her own body to get the full experience of wearing it. Although sophisticated computer graphics can realistically emulate the drape, folds, and stretch of cloth, this technology is not completely sufficient, and sometimes results in unexpected fit, color, and unpleasant feel of the fabric. Such technologies also do not cover the full range of ways in which a user can wear a garment. A buttoned-down shirt, for example, can be worn buttoned or unbuttoned, tight or baggy, tucked or untucked, tied at the bottom, and sleeves rolled to different lengths. The wide variety of fitting options ultimately requires physically trying on clothes.

None of the previous systems allows the shopper to simultaneously compare a currently worn garment against previously tried garments with synchronized view angles and/or body postures. Embodiments of the present invention provide a system that can enable a user to visually compare the effects of one or more clothing items in front of a mirror. Particularly, this system can enable a user to compare in close proximity the effects of the same or different users wearing similar or different clothing items. Furthermore, the system can substantially synchronize displayed poses to the current pose of the user.

For example, a system in accordance with an embodiment of the present invention might include a top-view camera, a front-view camera, a mirror, and two displays, each on one side of the mirror. The top-view camera detects images from the top-view of a user in a fitting area. The front-view camera detects images of the user as she stands in front of a mirror. The mirror itself can be digital or a conventional glass mirror. The display to one side of the mirror might contain an image of the same user with a different item of clothing. The display on the other side of the mirror might contain images of other users with similar or different clothing. In both displays the poses in the displayed images are synchronized with the movements of the user in front of the mirror. In essence, each time the user moves, a similar pose is retrieved and displayed, thus enabling synchronization.

Embodiments of the present invention can employ a database where the pose is stored and associated with each user. Different embodiments of the present invention can also be implemented with different perceptual systems such as laser range-finders, body scanners, or two or more digital cameras.

Visual Comparison of One or More Clothing Items

Figure 1:
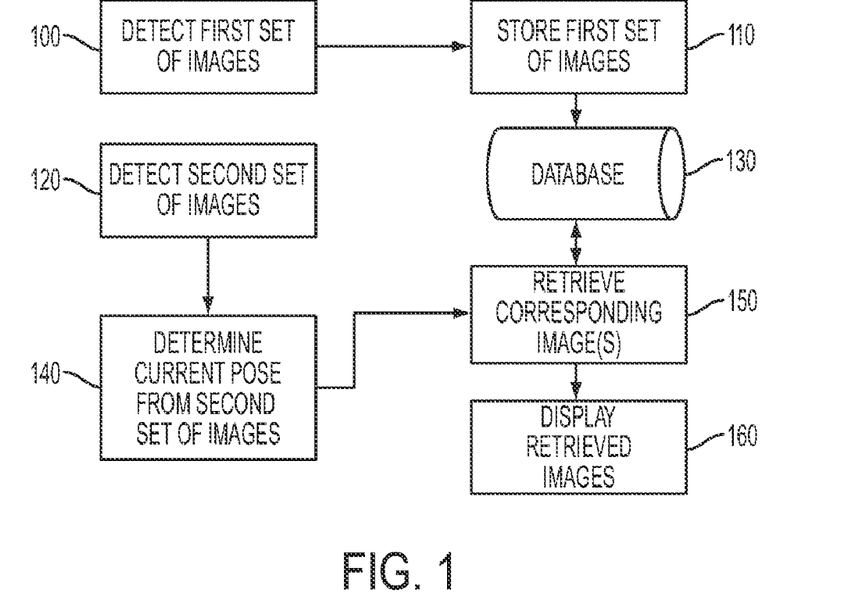
FIG. 1 presents an exemplary clothing comparison system in accordance with an embodiment of the present invention.

FIG. 1 presents an exemplary system to enable a user to visually compare one or more clothing items in front of a mirror in accordance with an embodiment of the present invention. During operation, the system detects a first set of images (operation 100).

The system then stores the first set of images in database 130 through a store pose process (operation 110). Assuming that the user is now wearing a second piece of clothing, the system subsequently detects the second set of images (operation 120), determines the current pose from the second set of images (operation 140) and retrieves from the database images of the user wearing different clothes but with a corresponding pose (operation 150). The system then displays the retrieved images with corresponding pose in close proximity to the mirror in a way that is synchronized to the user's movement or current poses (e.g., positions and gestures) (operation 160). Note that the process of detecting and storing images and determining a pose can be repeated multiple times for multiple poses.

The term "pose" as used herein means a user in a particular body configuration when the user is wearing a particular piece of clothing, such as body position and posture. For example, a "pose" can refer to the angular position of the user with respect to the mirror or display. A "pose" can also refer to the user's gesture, such as raising a leg, holding up an arm, or sitting down. The term "pose information" as used herein means any information that can be associated with a pose. For example, this information might be images associated with multiple views, previous poses, and a top-view orientation of each pose. The system can employ various techniques to extract such images, previous poses, and orientations from pose. In addition, the database can store not only pose, but also user information and clothing information.

As the user puts on a new piece of clothing and moves in front of the mirror, the system can repeat the process of retrieving images corresponding to the user's current pose and displaying the retrieved image(s). Thus the display is updated in synchronization with the user's moves. More specifically, the system can detect the user's current orientation with respect to the mirror, retrieve previously stored images corresponding to similar orientations, and display such images in synchronization with the user's movements. Consequently, the user can see herself in the mirror and compare the image in the mirror with the image displayed next to the mirror, simultaneously comparing two pieces of clothing from corresponding angles.

Note that in this description the term "corresponding pose" refers to the stored pose information which is associated with a pose that is virtually the same as the user's current pose. For example, a stored image of a user wearing a first shirt with the front of her torso facing the mirror is deemed to be the corresponding pose when the user is facing the mirror wearing a second shirt. Similarly, a stored image of a user wearing the first shirt with the front of her torso turned 45 degrees to the left of the mirror is deemed to be the corresponding pose when the user turns 45 degrees to the left of the mirror wearing the second shirt.

Detecting a set of images (operations 100 and 120) can be accomplished with any device that is able to detect the user's particular body configuration. Such devices can include video or still-image cameras, laser range-finders, body scanners, or motion capture systems.

Storing the first set of images (operation 110) can also be accomplished in multiple ways. For example, the system may store the pose information through a centralized database, an Internet server, or a set of distributed databases.

Note that, when retrieving corresponding images (operation 150), the system can use different comparison metrics to compare the currently detected pose information with the stored pose information corresponding to the user wearing a different outfit. For example, such comparison metrics can include difference squared, an absolute value of the difference, or a probabilistic measure of similarity, wherein the difference may be calculated between certain physical parameters such as the user's orientation angle with respect to the mirror and certain parameters of the images or reductions of the images.

The system can display the previously stored images in close proximity to the mirror in multiple ways. For example, the displayed images could appear in one display, a rotating display, or multiple displays clustered around the mirror, which itself could be digital.

Retrieving a Corresponding Pose Information

Figure 2:
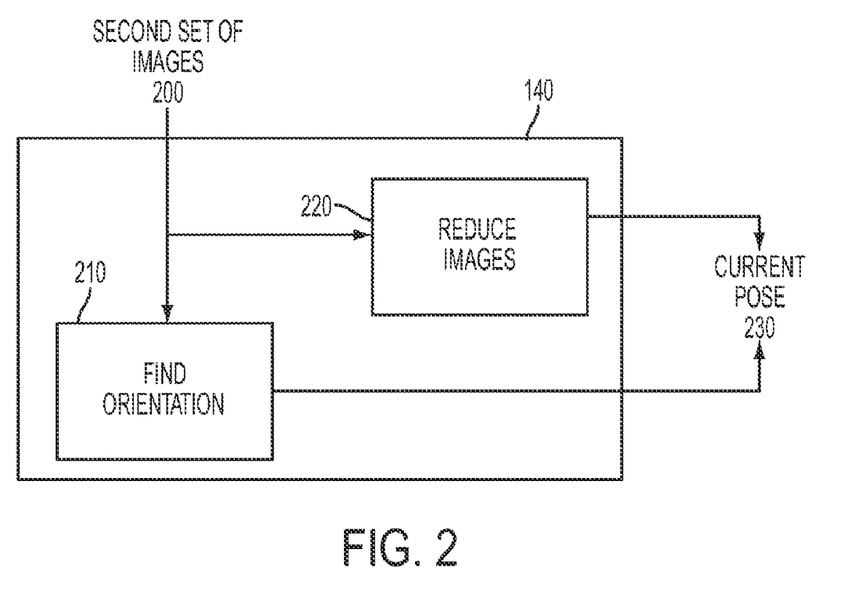
FIG. 2 presents an exemplary process for determining the current pose of the user.

FIG. 2 presents an exemplary process for determining the current pose from the second set of images 200. During operation, the system finds the orientation of the second set of images 200 (operation 210) and reduces the second set of images 200 (operation 220). These two operations (210 and 220) produce a current pose 230 for the user.

In one embodiment, find-orientation process 210 determines the orientation of the user with respect to the mirror based on the detected second set of images. Process 220 reduces the second set of images so that similarity between the determined current pose and the pose associated with a stored image can be evaluated more efficiently.

The system then searches database 130 and identifies images for the same user wearing different clothing which correspond to current pose 230 of the second set of images (see operation 150). For example, the system can identify images in database 130 of the same user, wearing different clothes and standing in front of the mirror with a corresponding orientation. This way, the system allows the user to compare the mirror reflection side-by-side with previously stored images from the same viewing angle. In one embodiment, to identify images that correspond to the user's current pose uses a weighted difference squared matching process (this will be explained in detail shortly). The output of process 150 can be one or more images of the user wearing different clothes and posing in a similar position and/or orientation to in her current position and/or orientation.

The weighted difference squared matching process works as follows. First, the system finds the orientation of the user's current pose. Next, the system reduces the detected image by applying various image processing techniques. This reduction simplifies the matching process and increases generality of matching. Finally, it searches through previously stored images to find those images that minimize the expression $W_O(O-O')^2+W_P(P_r-P_r')^2$, where O is the orientation of the current pose, O' is an orientation of the retrieved image; $P_r$ is the reduced current pose, $P_r'$ is a reduction of the retrieved image, $W_O$ is a weight in real numbers, and $W_P$ is a weight vector in real numbers.

Note that multiple weights can be used in computing the weighted difference squared and that multiple retrieval methods can be used to index into the database. For example, the system can use the following parameters as an index into the database: the orientation, user identification (which can be used to retrieve pose information associated with specific piece(s) of clothing tried by the user and/or by other users), a clothing item identification (which can be used to retrieve pose information associated with specific piece(s) of clothing tried by the user and/or others), or a time stamp (which can be used to retrieve pose information associated with piece(s) of clothing most recently tried by the user).

The aforementioned image-reduction can be generalized as image processing, and can be optional for the system operation. In other words, the system can operate properly without performing this image-reduction process.

Finding Orientation

Figure 3:
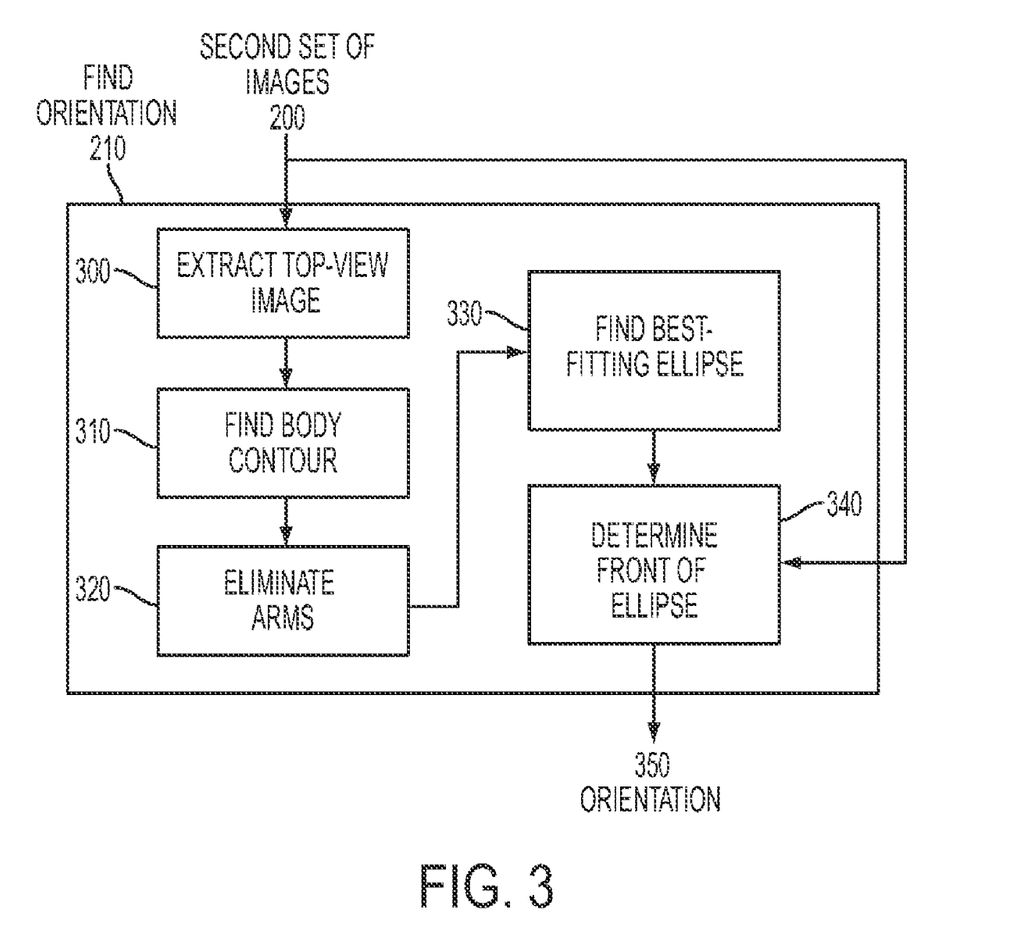
FIG. 3 presents an exemplary process for finding orientation in accordance with an embodiment of the present invention.

FIG. 3 presents an exemplary process for finding orientation (process 210) of a user in accordance with an embodiment of the present invention. During operation, the system inputs the second set of images 200 into process 300 which extracts a top-view image from second set of images, which in one embodiment includes a top-view image and a front-view image. The top-view image is then fed into process 310, which finds the body contour of the top-view image. Next, the system feeds this body contour into process 320, which removes contour of the user's arms to make top-view body contour simpler to fit an ellipse. This ellipse is in turn used to find the front of the user. Subsequently, the system inputs the body contour with arms eliminated into process 330 which finds the best-fitting ellipse. Since in general the top view of the body with arms removed is approximately elliptical, this process captures an acceptable elliptical fit to the body without the arms. Once the ellipse is fit, process 340 determines the front of the ellipse using second set of images and the best-fitting ellipse and outputs the user's orientation 350.

Note that extracting a top-view image can be accomplished using various techniques. For example, a top-view camera can facilitate this process, since the system can use the image from the top-view camera to extract the top-view image (process 300).

Similarly, the process of finding a best-fitting ellipse can use various image processing and mathematical manipulation techniques.

Figure 10A:
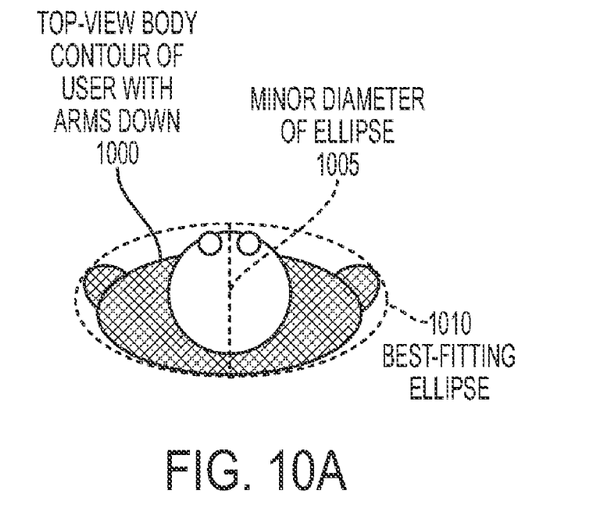
FIG. 10A presents an exemplary process for fitting an ellipse to a top-view body contour of a user with arms down in accordance with one embodiment of the present invention.

In accordance with an embodiment of the present invention, finding orientation is efficiently accomplished with a top-view camera. This is because the image of a typical user, when taken from above, is often shaped like an ellipse. The major axis represents a line through both shoulders; and the minor axis represents the body orientation. This is shown in FIG. 10A. The checked pattern 1000 is the top-view body contour of the user with arms down, which is then approximated by a best-fitting ellipse 1010. The minor axis of the ellipse 1005 is the dashed line passing through and splitting the user's left from right.

Because the axis's of ellipse may not be sufficient to determine the user's front from back, additional methods can be used, which are described in more detail in subsequent sections.

Figure 4:
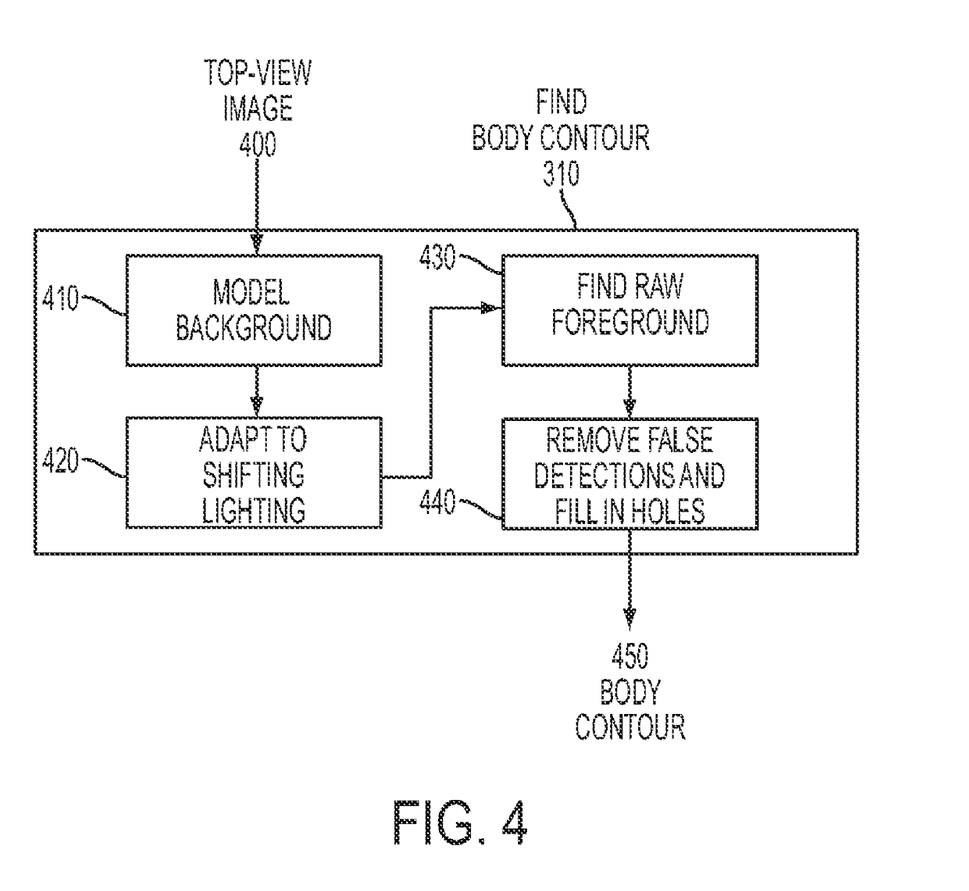
FIG. 4 presents an exemplary process for finding body contour in accordance with an embodiment of the present invention.
Figure 10B:
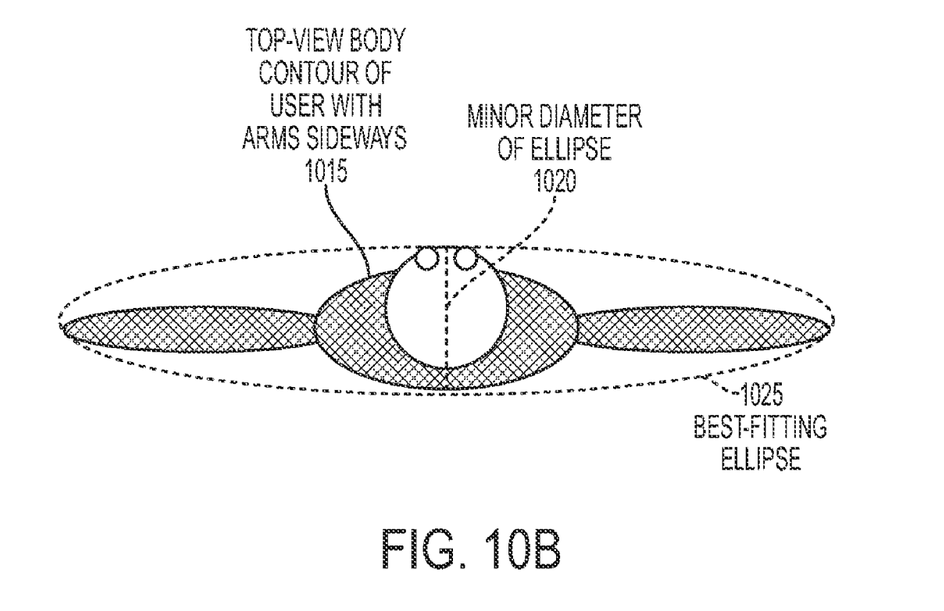
FIG. 10B presents an exemplary process for fitting an ellipse to a top-view body contour of a user with arms extended sideways in accordance with one embodiment of the present invention.
Figure 10C:
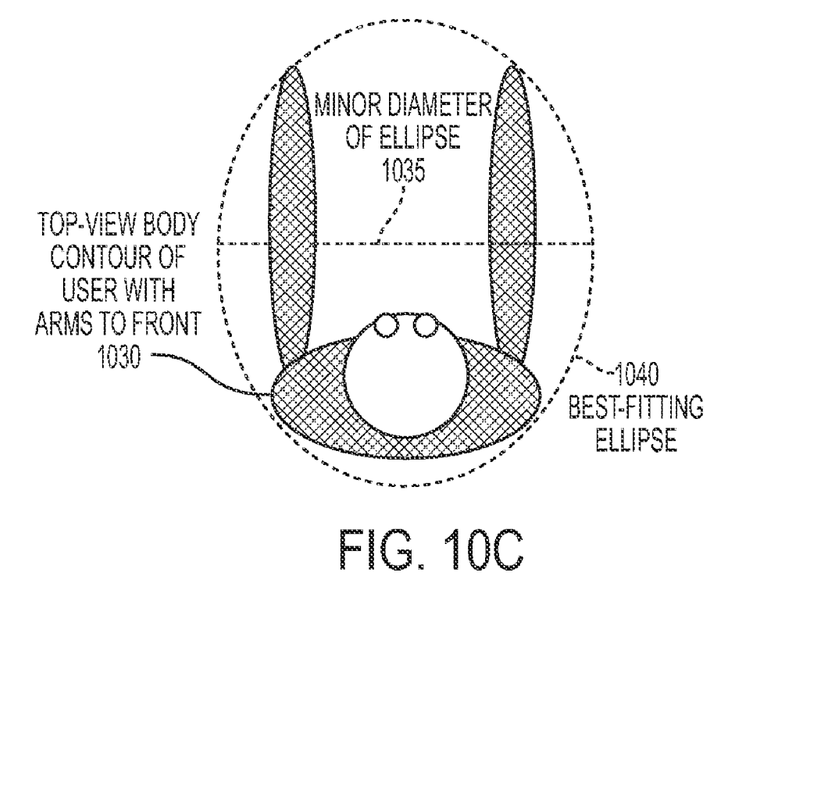
FIG. 10C presents an exemplary process for fitting an ellipse to a top-view body contour of a user with arms extended to the front in accordance with one embodiment of the present invention.

One problem with ellipse-fitting is that a user's pose may affect body shape. For example, consider the case when a user extends his/her arms sideways as shown in FIG. 10B or to the front as shown in FIG. 10C. In FIG. 10B, the minor axis 1020 of best-fitting ellipse 1025 is sufficient to establish the front-back distinction based on the top-view body contour 1015 of the user with arms extended sideways. However, as shown in FIG. 10C, the minor axis 1035 of a best-filling ellipse 1040 is not sufficient to establish the front-back distinction from the top-view body contour 1030 of the user with arms extended to front. This is because the arms elongate the normal top-view ellipse of the body toward the front. The arms contribute to the overall body contour, making the orientation detection sensitive to arm position. In one embodiment, the system removes the images of arms from the top-view body contour. Once the arms are removed, as in FIG. 10D, the minor axis 1050 of best-fitting ellipse 1055 is sufficient to estimate the front-back distinction from the top-view body contour 1045 of the user Finding Body Contour FIG. 4 presents an exemplary process for finding body contour in accordance with an embodiment the present invention. During operation, the system inputs top-view image 400 into process 410, which uses image processing methods to model the background. For example, an image without the user can be used to model the background. Similarly, process 420 could use image processing methods such as ambient lighting detection to adapt the system to shifting lighting. Process 430 finds the raw foreground using the background model as adapted by shifting lighting. Next, process 440 removes false detections and fills in holes.

Removing False Detections and Filling in Holes

Figure 5:
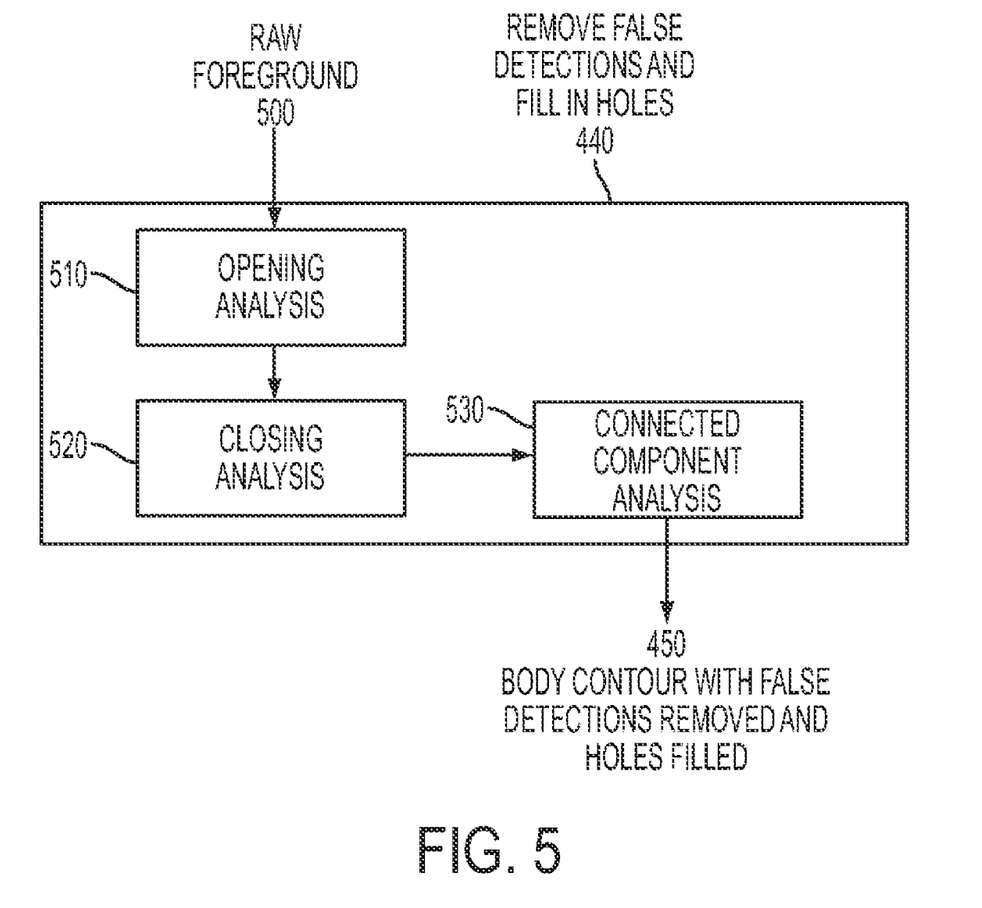
FIG. 5 presents an exemplary process for removing false detection and filling in holes in accordance with an embodiment of the present invention.

FIG. 5 presents an exemplary process for removing false detection and filling in holes on a detected image in accordance with an embodiment of the present invention. During operation, the system inputs raw foreground 500 into three morphological methods: opening analysis (process 510), closing analysis (process 520), and connected component analysis (process 530). These three morphological methods produce a body contour with false detections removed and holes filled 450. Detailed description of these three can be found in, for example, Gonzalez and Woods, "Digital Image Processing," 3$^{rd}$ Edition, CRC Press, Boca Raton, Fla., August 2007, hereinafter "Gonzalez and Woods."

Eliminating Arms

Figure 6:
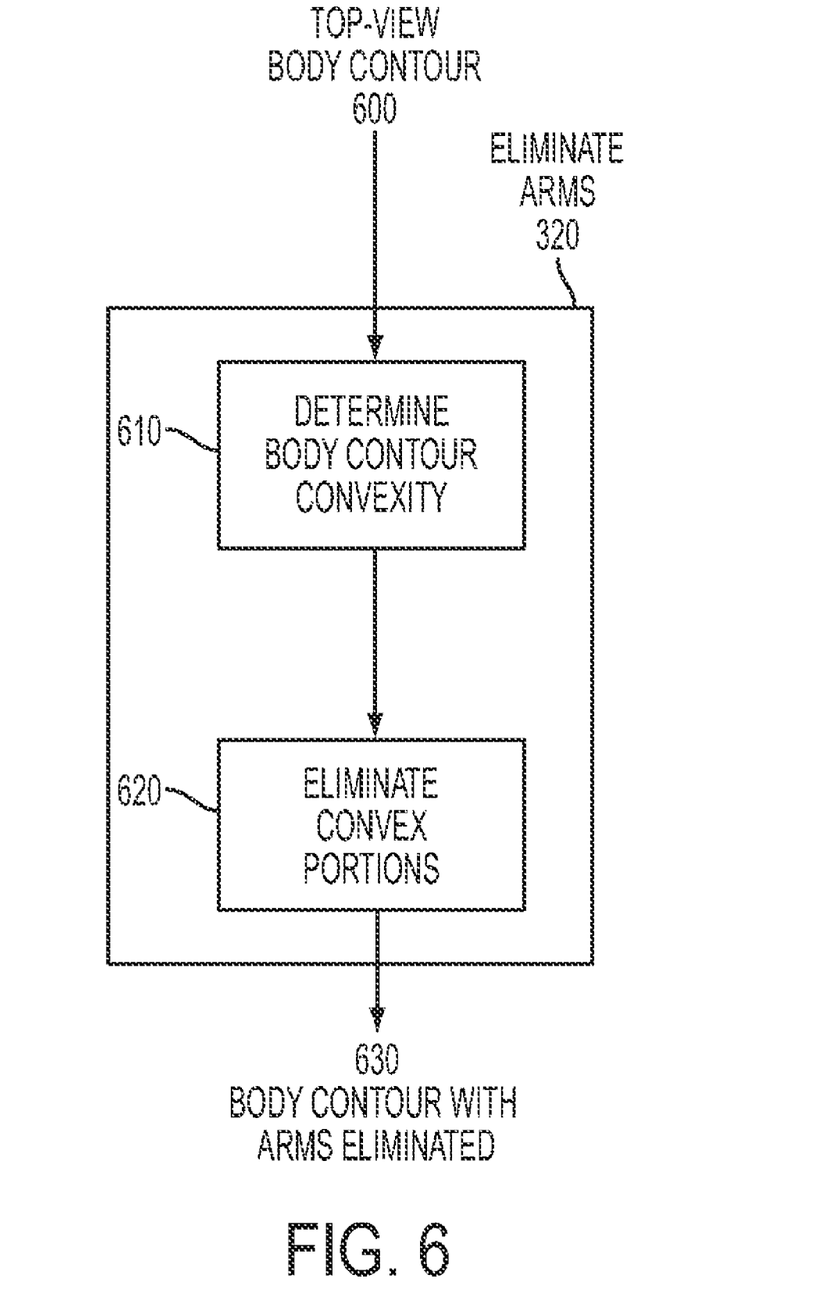
FIG. 6 presents an exemplary process for eliminating the user's arms in accordance with an embodiment of the present invention.

FIG. 6 shows how to eliminate the arms from an image of a user in accordance with one embodiment of the present invention. To handle various poses, the system takes as input the top-view body contour 600 and determines a body contour convexity (process 610). If the body contour is approximately convex, that means it is a good indicator that the arms are well-aligned with the body. If the user is extending arms sideways, the body contour is close to convex. In contrast, if a user is extending arms to the front, the body contour is likely to be in a U-shape, which is concave.

In this case, the convex portions of this concave shape (i.e., the arms) and their corresponding pixels can ideally be eliminated. Process 620 eliminates the convex portions using a morphological opening operator (erosion followed by dilation) to eliminate arms from the foreground body pixels. The morphological opening operator uses a kernel roughly the diameter of the arm. Any thin branches with a width less than the kernel size are eliminated by erosion. This arm-elimination process can also be used in pose estimation since the top-view camera has already identified arm positions. Details of erosion and dilation can be found in, for example, Gonzalez and Woods.

Figure 10D:
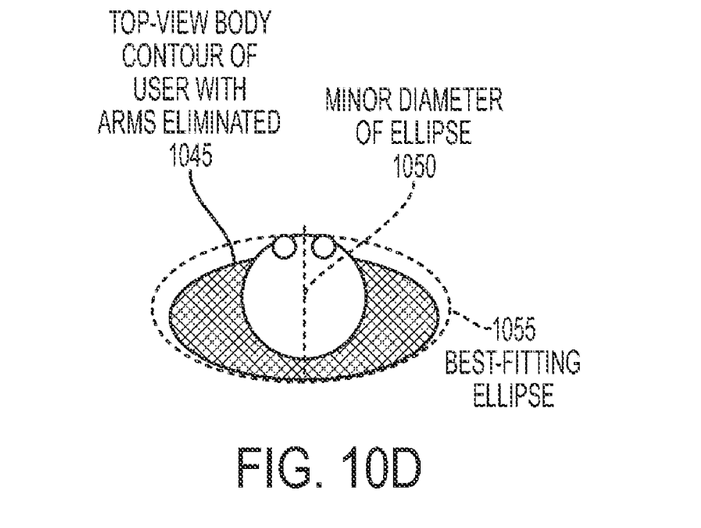
FIG. 10D presents an exemplary process for fitting an ellipse to a top-view body contour of a user, determining the minor axis of the ellipse, and finding a minor axis after the contour of the arms has been eliminated in accordance with one embodiment of the present invention.

FIG. 10D shows how the best-fitting ellipse 1055 fits the top-view body contour of user with arms eliminated 1045. In this example, the minor axis of the ellipse 1050 now correctly identifies the front-back line.

Determining the Front of the Best-Fitting Ellipse

Figure 7:
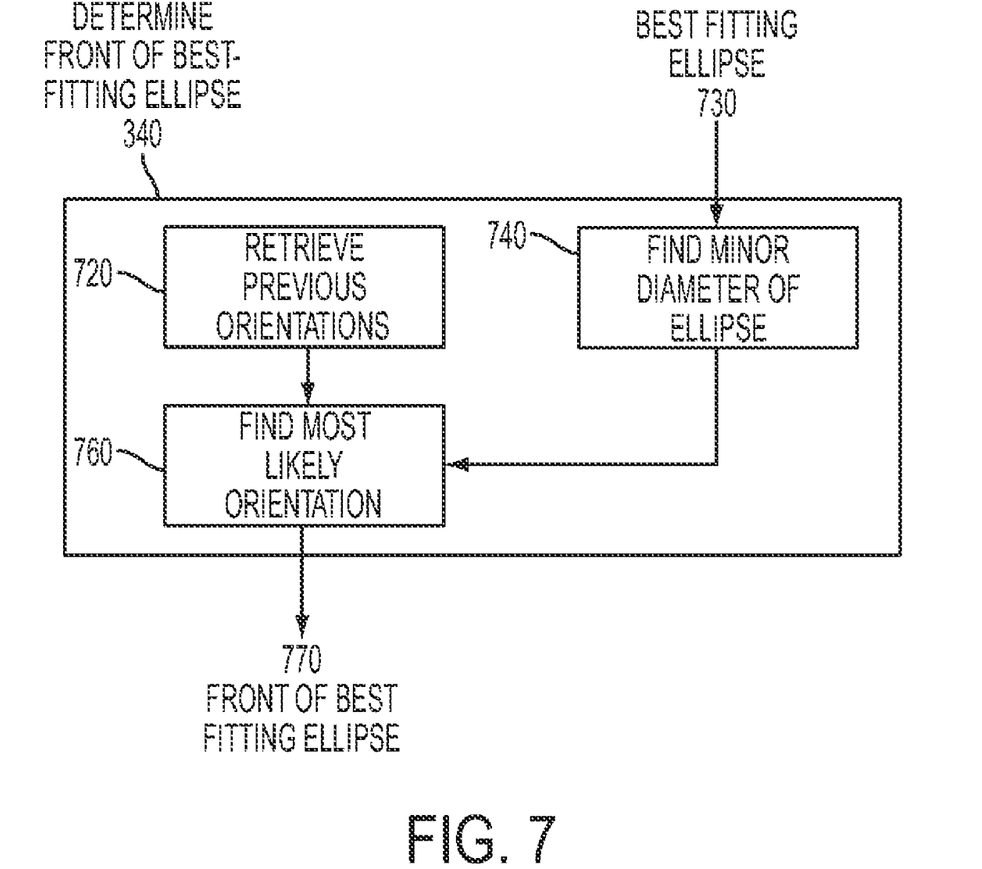
FIG. 7 presents an exemplary process for determining the front of the best-fitting ellipse in accordance with an embodiment of the present invention.

Once the minor axis has been identified in the best-fitting ellipse, the front needs to be disambiguated from the back. Ambiguity also arises, for example, when a user folds his/her arms in the front, which makes the body shape more circular. This ambiguity can be resolved by leveraging historical information assuming that users change orientation smoothly. FIG. 7 presents an exemplary process for determining the front of the best-fitting ellipse in accordance with an embodiment of the present invention. Given the best fitting ellipse 730, process 740 finds the minor axis of the ellipse. Next, process 750 extracts the forward-facing and backward-facing possible orientations and inputs them to process 760 which selects the most likely orientation and which also takes as input previous orientations from process 720. Process 760 outputs the most likely front of the best-fitting ellipse 770.

In one embodiment, process 760 uses a probabilistic model for orientation prediction given past orientations. One method that can be used for this task is particle filtering. The particle filter balances between two models: (1) a state evolution model which models how users change orientation from frame to frame, and (2) a likelihood model which models how the orientation detection result may deviate from ground truth. The particle filter is recursive: given the previous orientation estimate at time t−1, the system first predicts the user's orientation at time t, and then applies the new orientation detection result to adjust the prediction. Ambiguity can also be eliminated because a user cannot suddenly turn 180 degrees between two frames. Hence, the previous orientations can help to disambiguate a top-view body contour's front side from back side.

Another technique that can be used to determine the user's front is to apply various face-recognition methods.

Reducing Detected Images

Figure 8:
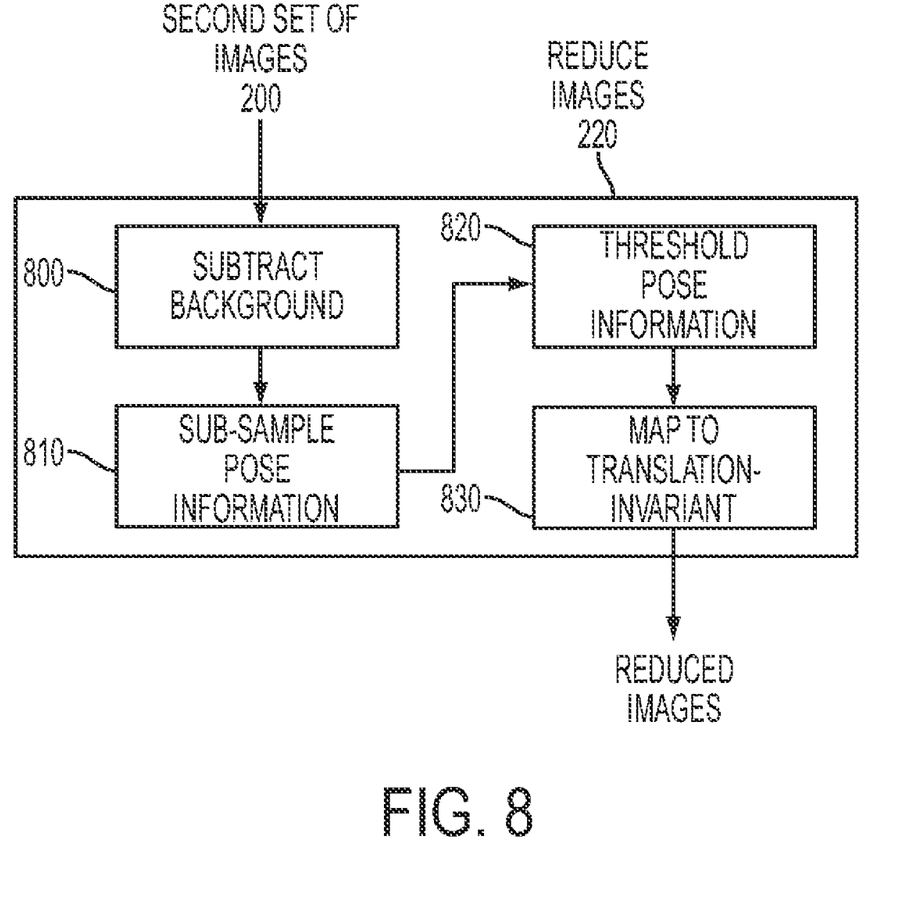
FIG. 8 presents an exemplary process for reducing images of the user in accordance with an embodiment of the present invention.

FIG. 8 presents an exemplary process for reducing the second set of images (process 220) in accordance with an embodiment of the present invention. During operation, the system inputs the second set of images 200 into process 800, which subtracts the background from the second set of images. Process 810 then sub-samples portions of the image and inputs them to process 820, which eliminates certain pose information that is not above a given threshold. Finally, this pose information is mapped into a form that is translation-invariant through process 830. Process 830 allows the user to move horizontally without affecting the system (provided that the user is within the bounds of the system). For example, if the user appears in the upper-right portion of one top-view image and in the lower-right portion of another top-view image, with the same pose, the translation-invariant mapping ensures the same results. Various techniques can be used for a translation-invariant mapping.

Defining a parameter space for finding corresponding poses can be challenging since this process could involve detecting and modeling the body parts and performing motion capture. However, for the specific purpose of comparison between different pieces of clothing, it may suffice to extract basic image features and perform pose matching from these features. For example, the system can operate in a time-division manner and carry out calculation at certain time steps. At each time step, the feature set for pose matching includes two small grayscale images obtained from sub-sampling the result of background subtraction and thresholding from the front-view and ceiling cameras.

Pose matching is performed by measuring the squared difference in the features, i.e., the two grayscale images, to obtain the best match. Specifically a translation-invariant sum of squares difference in intensity values is performed by finding the minimum over different relative translations in the corresponding front-view and ceiling features. Then, the two differences are added to obtain a single difference measure. The best matching pose is chosen according to the minimum of this difference measure across comparisons in the database. By using features derived from multiple views, ambiguity in one camera can be resolved by features from the other. For example, it is easy to confuse the pose in the second example with its horizontal reflection using only the front-view features. Fortunately, the top-view features disambiguate this case.

Exemplary Clothing Comparison System

Figure 9:
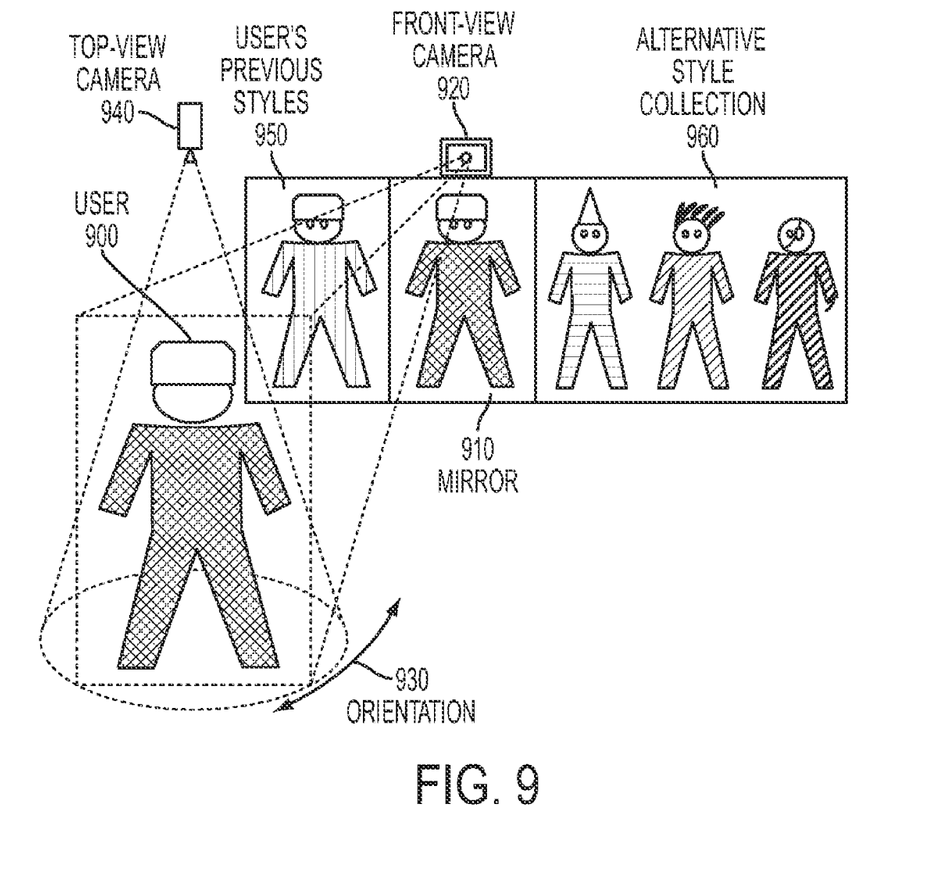
FIG. 9 illustrates a fitting room clothing comparison system in accordance with an embodiment of the present invention.

FIG. 9 illustrates a fitting room clothing comparison system in accordance with an embodiment of the present invention. User 900 stands below top-view camera 940 with orientation 930. Top-view camera 940 detects the top-view of the user, which is then used to determine orientation in accordance with an embodiment of this invention. Front-view camera 920 similarly detects front-view images in accordance with an embodiment of this invention. Images from both cameras form the pose. Note that one, two, or more cameras may be used for capture the user images. The clothing comparison system displays the user's previous styles 950 and the styles of other users (alternative style collection 960) in close proximity to mirror 910. As the user changes orientation, so changes the orientation of the images displayed in user's previous styles 950 and alternative style collection 960. This system enables a user to visually compare effects of one or more clothing items in front of the mirror.

Note that the user can select from multiple previous sets of images and the system can simultaneously display multiple images corresponding to more than two pieces of clothing in synchronization to the user's moves. This allows the user to compare more than two pieces of clothing at one time.

In one embodiment, the system allows the user to control the orientation of the retrieved images so that they do not necessarily match the user's current pose. For example, this allows the user to look at her back without necessarily having to turn away from the display. Note one or more cameras can be used in the fitting room in this system.

Figure 11:
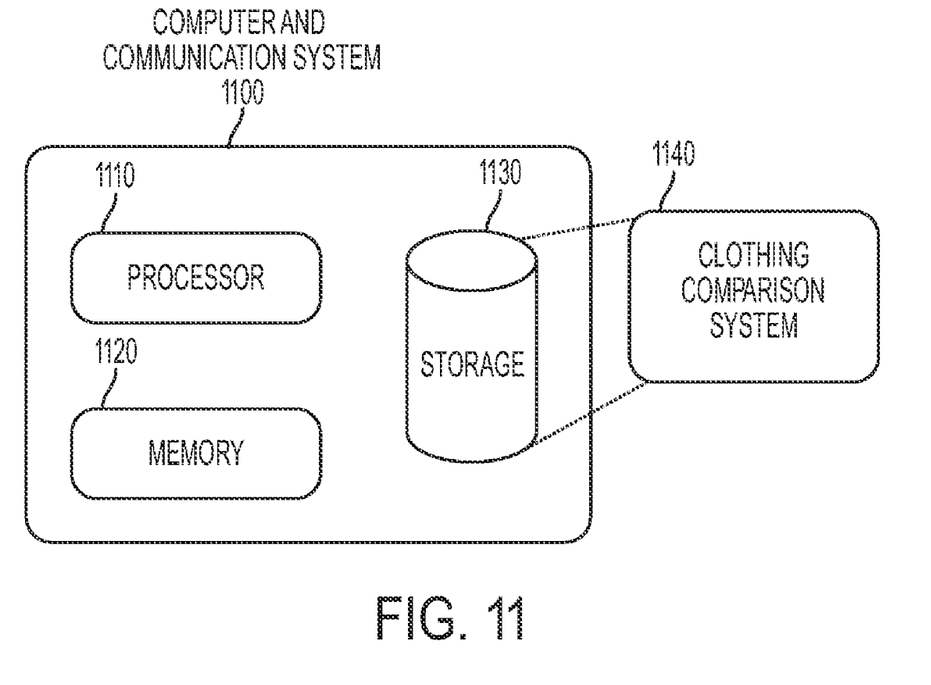
FIG. 11 presents an exemplary computer system for enabling a user to compare the effects of one more clothing items in front of a mirror in accordance with an embodiment of the present invention.

FIG. 11 presents an exemplary computer system for enabling a user to compare the effects of one more clothing items in front of a mirror in accordance with an embodiment of the present invention. A computer and communication system 1100 includes a processor 1110, a memory 1120, and a storage device 1130. Storage device 1130 stores programs to be executed by processor 1110. Specifically, storage device 1130 stores a program that implements a clothing comparison system 1140. During operation, the program for clothing comparison system 1140 is loaded from storage device 1130 into memory 1120 and executed by processor 1110.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer executed method for augmenting a mirror with information related to the mirrored contents and motion, comprising:
   detecting a first set of images of a user wearing a first piece of clothing in front of the mirror;
   storing the first set of images;
   detecting a second set of images of the user wearing a second piece of clothing in front of the mirror;
   determining a current pose of the user based on the second set of images;
   retrieving from the first set of images at least one image, wherein the retrieved image corresponds to the current pose of the user; and
   displaying the retrieved image in close proximity to the mirror in substantial synchronization with the user's motion, thereby enabling the user to visually compare effects of the first piece of clothing with the second piece of clothing.

2. The method of claim 1, wherein determining the current pose of the user based on the second set of images comprises:
   finding an orientation based on the second set of images; and
   processing the second set of images.

3. The method of claim 2, wherein finding the orientation based on the second set of images comprises:
   extracting a top-view image;
   finding a body contour in the top-view image;
   eliminating shapes of the user's arms from the top-view body contour when the arms are extended to the side or in front of the body;
   finding a best-fitting ellipse to the top-view body contour; and
   determining a front side of the best-fitting ellipse.

4. The method of claim 3, wherein finding the body contour in the top-view image comprises:
   modeling a background;
   adapting to shifting lighting;
   finding a raw foreground by background subtraction; and
   removing false detections and filling in holes in the raw foreground by a morphological analysis.

5. The method of claim 4, wherein removing false detections and filling in holes by a morphological analysis involves performing at least one of an opening analysis, closing analysis, and connected component analysis.

6. The method of claim 3, wherein eliminating shapes of the user's arms from the top-view body contour comprises:
   determining body contour convexity; and
   eliminating convex portions of the body contour by eroding and dilating the image using a kernel that is approximately the diameter of an arm.

7. The method of claim 3, wherein determining the front-side of the best-fitting ellipse involves detecting the user's face.

8. The method of claim 3, wherein determining the front-side of the best-fitting ellipse comprises: retrieving previous orientations of the user; finding a minor axis of the best-fitting ellipse; finding a most likely orientation of the minor axis with a probabilistic model applied to the previous orientations and a set of possible orientations of the minor axis; and
   using the user's frontal features to distinguish the front-side from the back-side.

9. The method of claim 2, wherein processing the second set of images comprises:
   subtracting a background from the set of images; subsampling the pixels in the set of images; thresholding the pixels in the set of images; and mapping the images so that the images are translation-invariant.

10. The method of claim 1, wherein retrieving at least one image that corresponds to the current pose of the user comprises: finding an orientation of the current pose; processing the current pose; and retrieving an image wherein the difference between the retrieved image and the image corresponding to the user's current pose is minimized.

11. The method of claim 1, further comprising allowing the user to control the orientation of the displayed images so that the displayed images do not necessarily match the user's current pose.

12. An apparatus for enabling a user to visually compare effects of one or more clothing sets in front of a mirror, comprising:

a detection mechanism configured to detect a first set of images of a user wearing a first piece of clothing in front of the mirror and to detect a second set of images of the user wearing a second piece of clothing in front of the mirror; a storage mechanism configured to store the first set of images;

a pose-finding mechanism configured for determining a current pose of the user based on the second set of images;

an image-retrieval mechanism configured to retrieve from the first set of images at least one image, wherein the retrieved image corresponds to the current pose of the user; and a display mechanism configured to display the retrieved image in close proximity to the mirror in substantial synchronization with the user's motion, thereby enabling the user to visually compare effects of the first piece of clothing with the second piece of clothing.

13. The apparatus of claim 12, wherein while determining the current pose of the user based on the second set of images, the pose-finding mechanism is configured to:

find an orientation based on the second set of images; and
process the second set of images.

14. The apparatus of claim 13, wherein while finding the orientation based on the second set of images, the pose-finding mechanism is further configured to:

extract a top-view image;
find a body contour in the top-view image;
eliminate shapes of the user's arms from the top-view body contour when the arms are extended to the side or in front of the body;
find a best-fitting ellipse to the top-view body contour; and
determine a front side of the best-fitting ellipse.

15. The apparatus of claim 14, wherein while finding the body contour in the top-view image, the pose-finding mechanism is further configured to:

model a background;
adapt to shifting lighting;
find a raw foreground by background subtraction; and
remove false detections and filling in holes in the raw foreground by a morphological analysis.

16. The apparatus of claim 15, wherein while removing false detections and filling in holes by a morphological analysis, the pose-finding mechanism is further configured to perform at least one of an opening analysis, closing analysis, and connected component analysis.

17. The apparatus of claim 14, wherein while eliminating shapes of the user's arms from the top-view body contour, the pose-finding mechanism is further configured to:

determine body contour convexity; and
eliminate convex portions of the body contour by eroding and dilating the image using a kernel that is approximately the diameter of an arm.

18. The apparatus of claim 14, wherein while determining the front side of the best-fitting ellipse, the pose-finding mechanism is further configured to detect a user's face.

19. The apparatus of claim 14, wherein while determining front the front side of the best-fitting ellipse, the pose-finding mechanism is further configured to:

retrieve previous orientations of the user; find a minor axis of the best-fitting ellipse; find a most likely orientation of the minor axis with a probabilistic model applied to the previous orientations and a set of possible orientations of the minor axis; and
use the user's frontal features to distinguish the front-side from the back-side.

20. The apparatus of claim 13, wherein while processing the second set of images, the pose-finding mechanism is further configured to:

subtract a background from the set of images; sub-sample the pixels in the set of images; threshold the pixels in the set of images; and map the images so that the images are translation-invariant.

21. The apparatus of claim 12, wherein while retrieving at least one image that corresponds to the current pose of the user, the image retrieval mechanism is further configured to:

find an orientation of the current pose; process the current pose; and
retrieve an image wherein the difference between the retrieved image and the image corresponding to the user's current pose is minimized.

22. The apparatus of claim 12, further comprising a control mechanism configured to allow the user to control the orientation of the displayed images so that the displayed images do not necessarily match the user's current pose.

23. A non-transitory computer-readable storage medium storing instructions that when executed by a computer cause the computer to perform a method for augmenting a mirror with information related to the mirrored contents and motion, the method comprising:

detecting a first set of images of a user wearing a first piece of clothing in front of the mirror;
storing the first set of images;
detecting a second set of images of the user wearing a second piece of clothing in front of the mirror;
determining a current pose of the user based on the second set of images;
retrieving from the first set of images at least one image, wherein the retrieved image corresponds to the current pose of the user; and
displaying the retrieved image in close proximity to the mirror in substantial synchronization with the user's motion, thereby enabling the user to visually compare effects of the first piece of clothing with the second piece of clothing.

* * * * *